(12) United States Patent
Kimura et al.

(10) Patent No.: US 7,946,473 B2
(45) Date of Patent: May 24, 2011

(54) AUTHENTICATION INFORMATION MANAGEMENT SYSTEM, AUTHENTICATION INFORMATION MANAGEMENT SERVER, AUTHENTICATION INFORMATION MANAGEMENT METHOD AND PROGRAM

(75) Inventors: Mitsuhiro Kimura, Kanagawa (JP); Tomoharu Hikita, Tokyo (JP)

(73) Assignee: Sony Corporation, Tokyo (JP)

( * ) Notice: Subject to any disclaimer, the term of this patent is extended or adjusted under 35 U.S.C. 154(b) by 568 days.

(21) Appl. No.: 12/121,513

(22) Filed: May 15, 2008

(65) Prior Publication Data

US 2008/0283595 A1 Nov. 20, 2008

(30) Foreign Application Priority Data

May 15, 2007 (JP) ................................ P2007-129328

(51) Int. Cl.
*G06F 17/00* (2006.01)
(52) U.S. Cl. ........................................................ 235/375
(58) Field of Classification Search .................. 235/375, 235/492
See application file for complete search history.

(56) References Cited

FOREIGN PATENT DOCUMENTS

| JP | 62-78644 | 4/1987 |
|----|----------|--------|
| JP | 1-118981 | 5/1989 |
| JP | 2-73459 | 3/1990 |
| JP | 2-150395 | 6/1990 |
| JP | 4-245586 | 9/1992 |
| JP | 10-111896 | 4/1998 |
| JP | 11-149451 | 6/1999 |
| JP | 2002-63136 | 2/2002 |
| JP | 2006-260580 | 9/2006 |
| JP | 2006-350444 | 12/2006 |
| WO | WO 00/13089 | 3/2000 |

*Primary Examiner* — Daniel A Hess
(74) *Attorney, Agent, or Firm* — Finnegan, Henderson, Farabow, Garrett & Dunner, L.L.P.

(57) ABSTRACT

There is provided an authentication information management system including: an information processing terminal mounted with an IC chip capable of non-contact communication with a reader/writer; and an authentication information management server capable of communication with the information processing terminal, wherein the information processing terminal includes: a plurality of memory areas provided in the IC chip for each of functions of the IC chip; and a plurality of applications for achieving each of the functions of the IC chip, and the authentication information management server includes: an authentication information setting portion for setting authentication information in the first memory area in response to a request sent from the first application of the information processing terminal; and an authentication information notifying portion which in response to a request sent from a second application of the information processing terminal, notifies the second application of the authentication information of the first memory area.

8 Claims, 5 Drawing Sheets

AUTHENTICATION INFORMATION MANAGEMENT SYSTEM, AUTHENTICATION INFORMATION MANAGEMENT SERVER, AUTHENTICATION INFORMATION MANAGEMENT METHOD AND PROGRAM

CROSS REFERENCE TO RELATED APPLICATION

The disclosure of Japanese Patent Application No. JP2007-129328, filed May 15, 2007, entitled "Authentication Information Management System, Authentication Information Management Server, Authentication Information Management Method and Program". The contents of that application are incorporated herein by reference in their entirety.

BACKGROUND OF THE INVENTION

1. Field of the Invention

The present invention relates to authentication information management system, authentication information management server, authentication information management method and program.

2. Description of the Related Art

In recent years, a non-contact type integrated circuit (IC) card in which the non-contact type IC chip capable of non-contact communication with a reader/writer is buried, a portable phone loaded with the non-contact type IC chip and the like have been prevalent. Information processing system using such a non-contact type IC chip has been widely used in a railways ticket gate and retailer's settlement system.

According to this non-contact type IC chip, an IC chip can be used for plural purposes such as commuter ticket, electronic money, point service and the like. Thus, the non-contact type IC chip has a function of managing data by, a memory area within the IC chip divided to plural individual memory areas, allocating each individual area to each purpose. Further, it has a function of excluding an unnecessary access from other application than the application for managing the individual memory areas in order to execute interoperation among the applications.

FIG. 5 is an explanatory diagram for explaining a method of limiting an access among applications to the memory area within the conventional IC chip. As shown in FIG. 5, applications A and B exist on an information processing terminal 1 such as a portable phone loaded with an IC chip 2 and individual memory areas A and B within the IC chip 2 are allocated to the applications A and B. Each individual memory area is limited from being accessed by password authentication. The application A has a password A for the individual memory area A and the application B has a password B for the individual memory area B. In this case, each password is a value fixed to each application and each application and individual memory area are notified of corresponding password preliminarily.

If password authentication function to each individual memory area is validated, the application A cannot access the individual memory area B because it has no password B for the individual memory area B. Likewise, the application B cannot access the individual memory area A because it has no password A.

There exists a case where it is desired to permit an individual memory area limited from being accessed to be accessed by other application than the application for controlling that individual memory area. Consequently, the same individual memory area can be shared among plural applications. For example, there is a case where one of related plural applications desires to use information of the other application for reference.

In such a case, according to the conventional method, a password needs to be notified to other application desiring to be permitted to access preliminarily because only the application for managing that area can be notified of the password necessary for accessing the area.

As a method for sharing the password among plural applications, for example, a method disclosed in Japanese Patent Application Laid-Open No. 11-149451 (hereinafter, referred to as Patent Document 1) has been known. The method described in the Patent Document 1 is used for sharing ID/password in plural WWW services. This method allows user of the WWW service to use plural WWW services without inputting an ID/password to each WWW service by using a one-time ID common to the plural applications set by server.

If the method of the Patent Document 1 is applied to the IC chip, the server side needs a generating section generating the password dynamically and a notifying section notifying each individual memory area and each application of a generated password each time. To this end, information processing terminal such as portable phone loaded with the non-contact type IC chip has no such sections in related art. Thus, to achieve this, it is necessary to set a new operation procedure for notifying of the password preliminarily. Additionally, there is such an issue that extra maintenance control cost for securing a safe notification passage is generated.

SUMMARY OF THE INVENTION

Accordingly, the present invention has been achieved in views of the above-described issues and it is desirable to provide a novel, improved authentication information management system, authentication information management server, authentication information management method and program therefore, capable of sharing the authentication information such as a password set in the individual memory area of an IC chip between an application as an administrator of the individual memory area and other applications according to a simple procedure.

According to an embodiment of the present invention, there is provided an authentication information management system including: an information processing terminal mounted with an IC chip capable of non-contact communication with a reader/writer; and an authentication information management server capable of communication with the information processing terminal through a network. The information processing terminal includes: a plurality of memory areas provided in the IC chip for each of functions of the IC chip; and a plurality of applications corresponding to each of the memory areas and for achieving each of the functions of the IC chip. Further, the authentication information management server includes: an authentication information setting portion for setting authentication information for use in accessing a first memory area corresponding to a first application in the first memory area in response to an authentication information setting request sent from the first application of the information processing terminal; and an authentication information notifying portion which in response to an authentication information acquiring request sent from a second application of the information processing terminal, reads out the authentication information of the first memory area and notifies the second application of the read authentication information.

Further, according to another embodiment of the present invention, there is provided an authentication information management server capable of communication with an information processing terminal mounted with an IC chip capable of non-contact communication with a reader/writer through a network and including a plurality of memory areas provided in the IC chip for each of functions of the IC chip and a plurality of applications corresponding to each of the memory areas and for achieving each of the functions of the IC chip, the authentication information management server including: an authentication information setting portion for setting authentication information for use in accessing a first memory area corresponding to a first application in the first memory area in response to an authentication information setting request sent from the first application of the information processing terminal; and an authentication information notifying portion which in response to an authentication information acquiring request sent from a second application of the information processing terminal, reads out the authentication information of the first memory area and notifies the second application of the read authentication information.

With such a structure, the authentication information setting portion of the authentication information management server sets up the authentication information for use for the first application to access the first memory area in the first memory area corresponding to the first application in response to the authentication information setting request sent from the first application of the information processing terminal. Further, the authentication information notifying portion of the authentication information management server reads out the authentication information of the first memory area and notifies the second application of the read authentication information in response to the authentication information acquiring request sent from the second application of the information processing terminal. Consequently, the second application can acquire the authentication information of the memory area in the IC chip administered by other applications (first application) through the authentication information management server. As a result, the first application and the second application can share data in the first memory area. Even if the first application changes the authentication information, the second application can acquire new authentication information through the authentication information management server thereby its availability being improved.

The authentication information setting portion may receive the authentication information generated by the first application from the first application and set the received authentication information in the first memory area. Consequently, the information processing terminal which executes the application can determine the authentication information. As a result, inherent authentication information can be set for each information processing terminal.

Alternatively, the authentication information setting portion may generate the authentication information in response to the authentication information setting request from the first application, set the generated authentication information in the first memory area and send the authentication information to the first application. Consequently, the authentication information management server which has received a request from the application can determine the authentication information. As a result, the authentication information management server can set the authentication information dynamically for each request from the application.

The present invention may further include an application authentication portion which when the authentication information setting request is received from the first application, authenticates whether or not the first application has a authority for setting the authentication information in the first memory area. Consequently, only the application having the privilege for management of the first memory area can set up the authentication information. As a result, setting of the authentication information by other applications can be avoided.

The present invention may further include an application authentication portion which when the authentication information acquiring request to the first memory area is received from the second application, authenticates whether or not the second application has a privilege for acquiring the authentication information of the first memory area. Consequently, the authentication information can be notified only the application having the privilege for acquiring the authentication information of the first memory area of. As a result, the applications sharing data of the first memory area can be limited to a particular application provided with the privilege preliminarily.

According to a still another embodiment of the present invention, there is provided an authentication information management server capable of communication with an information processing terminal mounted with an IC chip capable of non-contact communication with a reader/writer through a network and including a plurality of memory areas provided in the IC chip for each of functions of the IC chip and a plurality of applications corresponding to each of the memory areas and for achieving each of the functions of the IC chip, the authentication information management method including: an authentication information setting step for setting authentication information for use in accessing a first memory area corresponding to a first application in the first memory area in response to an authentication information setting request sent from the first application of the information processing terminal; and an authentication information notifying step which in response to an authentication information acquiring request sent from a second application of the information processing terminal, reads out the authentication information of the first memory area and notifies the second application of the read authentication information.

With such a method, the second application can acquire the authentication information in the memory area in the IC chip administered by other applications (first application) through the authentication information management server. Consequently, the first application and the second application can share data in the first memory area.

Further, according to a still another embodiment of the present invention, there is provided a program for making a computer function as an authentication information management server capable of communication with an information processing terminal mounted with an IC chip capable of non-contact communication with a reader/writer through a network and including a plurality of memory areas provided in the IC chip for each of functions of the IC chip and a plurality of applications corresponding to each of the memory areas and for achieving each of the functions of the IC chip, the authentication information management server including: an authentication information setting portion for setting authentication information for use in accessing a first memory area corresponding to a first application in the first memory area in response to an authentication information setting request sent from the first application of the information processing terminal; and an authentication information notifying portion which in response to an authentication information acquiring request sent from a second application of the information processing terminal, reads out the authentication information of the first memory area and notifies the second application of the read authentication information.

By executing such a program, the second application can acquire the authentication information in the memory area in the IC chip administered by other applications (first application) through the authentication information management server. As a result, the first application and the second application can share data in the first memory area.

Such a program can make hardware resource of a computer including CPU, ROM and RAM execute the functions of the authentication information setting portion and the authentication information notifying portion. That is, the computer for executing that program can be made to function as the authentication information management server.

As described above, the present invention enables the authentication information set in the individual memory area of the IC chip to be shared between an application as an administrator of the individual memory area and other applications according to a simple procedure.

DETAILED DESCRIPTION OF THE PREFERRED EMBODIMENTS

Figure 1:
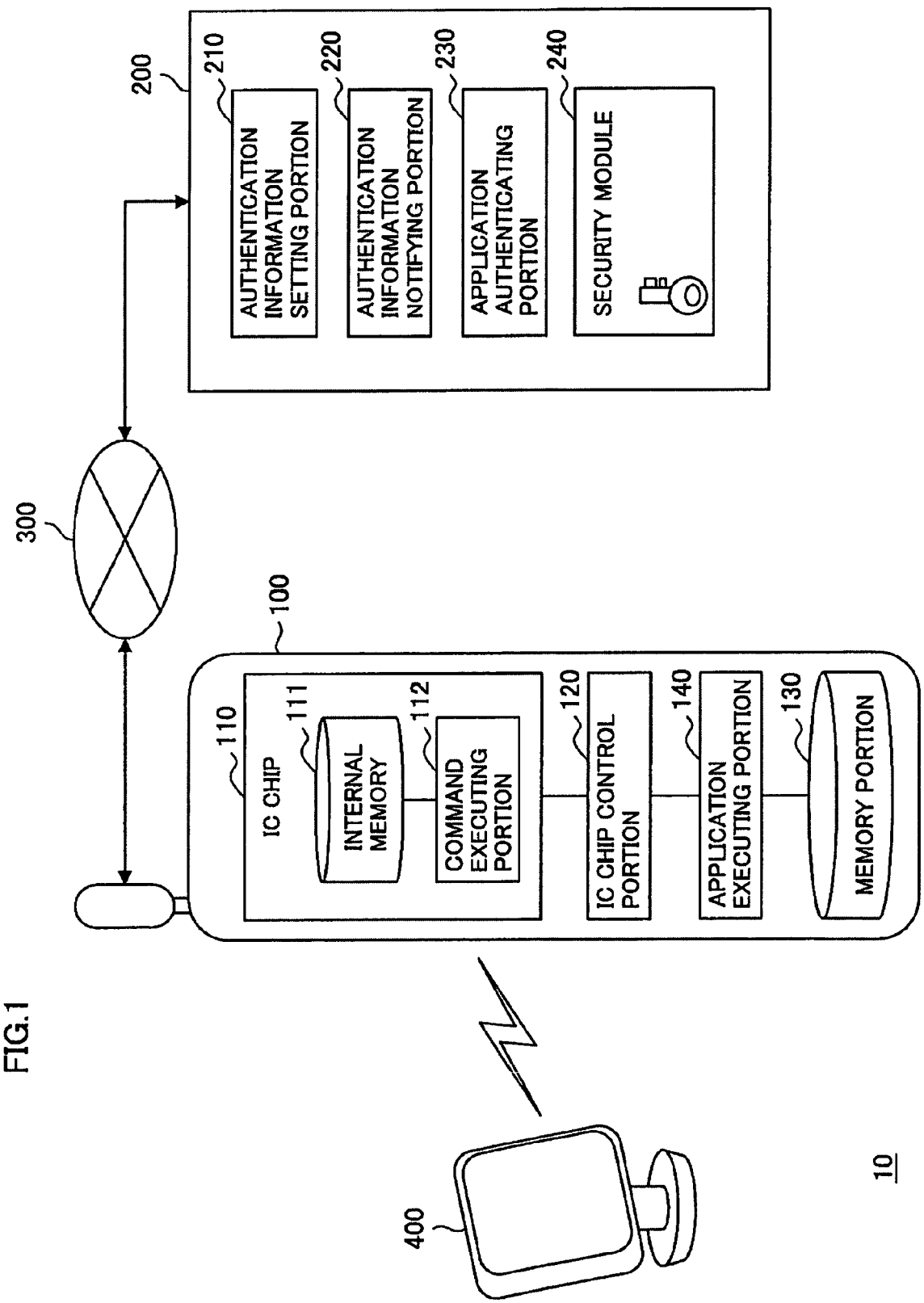
FIG. 1 is a block diagram for illustrating a schematic configuration of an authentication information management system according to a first embodiment.

The preferred embodiments of the present invention will be described in detail with reference to the accompanying drawings. Like reference numerals are attached to substantially like components in the specification and drawings and duplicated description thereof will not be described.

First Embodiment

The authentication information management system of the first embodiment of the present invention will be described with reference to FIG. 1. FIG. 1 is a block diagram showing the schematic configuration of an authentication information management system 10 according to the first embodiment.

As shown in FIG. 1, the authentication information management system 10 includes information processing terminal 100 and authentication information management server 200. The information processing terminal 100 and the authentication information management server 200 are configured to be able to communicate through a network 300. In this embodiment, the information processing terminal 100 is a portable phone having a function for communication and data transmission and the network 300 is a communication network provided by portable phone communication carriers.

The authentication information management system 10 authentication information such as personal identification number (PIN) which an application within the information processing terminal 100 uses upon accessing an internal memory in the IC chip. The management of the authentication information mentioned here refers to for example setting of authentication information to a memory area (called individual memory area) within the internal memory allocated to each application, notice of the set authentication information to an application and the like.

Further, the authentication information management system 10 provides a function for an individual memory area corresponding to a certain application to be accessed by a different application. Consequently, data in an individual memory area can be shared among different plural applications, so that data handled in the same way in terms of meaning can be managed centrally in an individual memory area. For example, user name and address existing within the individual memory area of an application for personal information management can be referred to by an application which provides individual services. If user's personal information is changed, the application which refers to that data can use updated personal information by correcting only that data.

As other example of using the aforementioned function, there is, for example, a case where if an application A is an application for settlement of credit and an application B is a management application for managing information of plural applications including the application A, related information (credit card name and term of validity and the like) of the application A recorded in the individual memory area of the application B is referred to by the application A. Additionally, there is another case where if an additional service is provided to an existing application already provided in the form of an expanded application, the expanded application refers to data in the individual memory area corresponding to the existing application.

The authentication information management system 10 according to this embodiment has a feature in that it provides a function for allowing the individual memory area corresponding to a certain application to be accessed by a different application so as to realize central management of data for use in common among different plural applications. Hereinafter, mainly the configuration of the authentication information management system 10 for achieving the above-described function will be described.

(Information Processing Terminal 100)

Referring to FIG. 1, the information processing terminal 100 includes an IC chip 110, an IC chip control portion 120, a memory portion 130 and an application executing portion 140.

(IC Chip 110)

The IC chip 110 can communicate with a reader/writer 400 located outside of the information processing terminal 100 wirelessly. For example, in case of retailer's settlement system, when user holds the information processing terminal 100 mounted with the IC chip 110 over the reader/writer 400 connected to a cash register provided in a shop, money information recorded in the IC chip 110 is read out through electromagnetic wave emitted from the reader/writer 400 or the money information after settlement is written into the IC chip 110. At this time, the IC chip 110 is driven by receiving supply of electricity from electromagnetic wave emitted by the reader/writer 400.

The configuration of the IC chip 110 will be described in detail with reference to FIG. 1. As shown in FIG. 1, the IC chip 110 mainly includes an internal memory 111 and a command executing portion 112. The IC chip 110 has tamper resistance, which blocks itself from being accessed from outside illegally. Hereinafter, respective components of the IC chip 110 will be described.

(Internal Memory 111)

The internal memory 111 is a memory medium for storing data for achieving the function loaded in the IC chip 110. The internal memory 111 is divided to plural small areas (called individual memory area). Each individual memory area corresponds to an application for achieving each function of the IC chip 110 one to one and data for use by each application is recorded in the individual memory area. The aforementioned application is stored in the memory portion 130. Each application refers to data in the individual memory area of the internal memory 111 in a process of being executed by the application executing portion 140.

Figure 2:
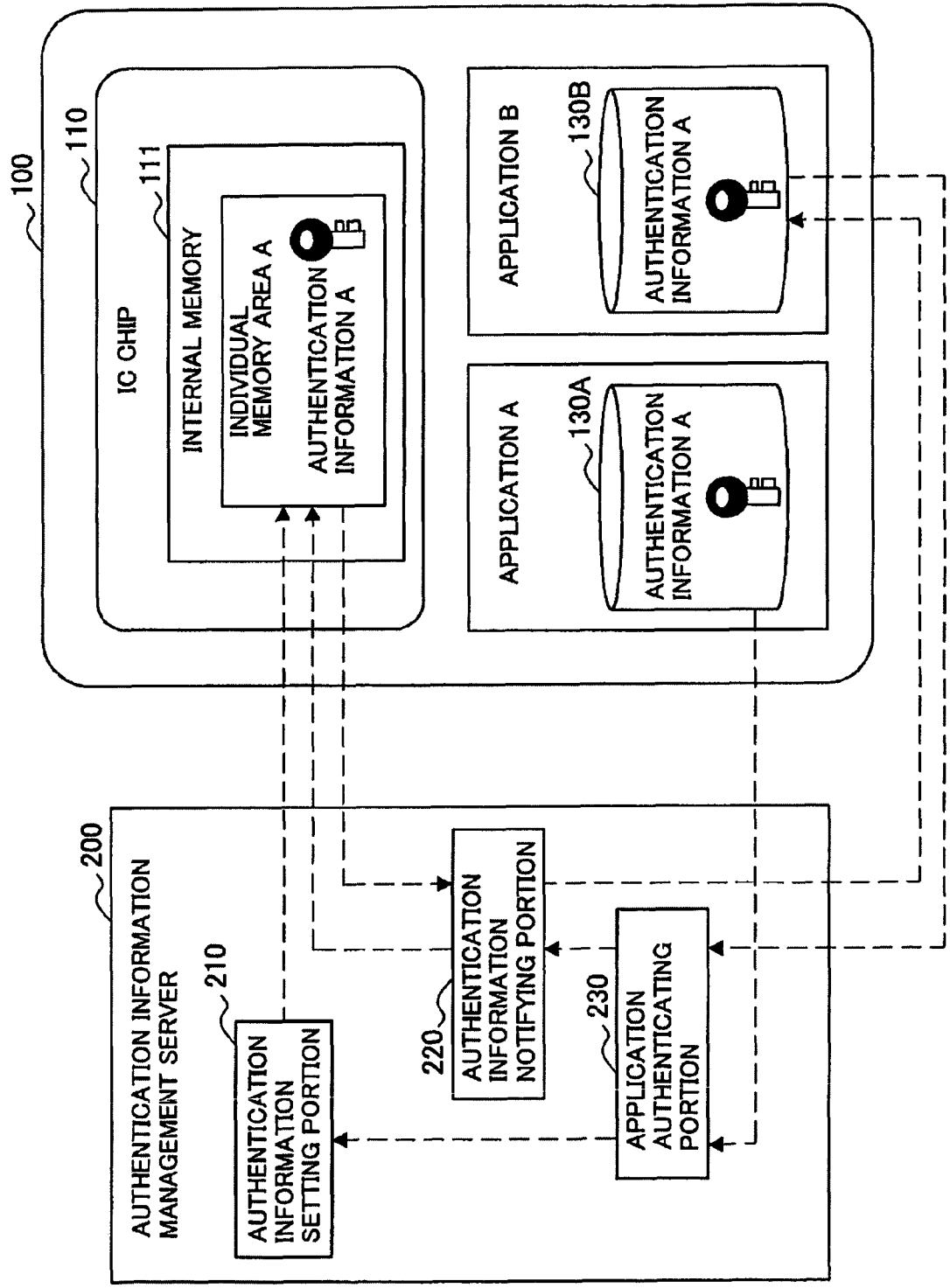
FIG. 2 is an explanatory diagram for explaining the management method of authentication information according to the first embodiment.

The individual memory area has inherent authentication information and the application can access the individual memory area through authentication based on the authentication information. For example, as shown in FIG. 2, the internal memory 111 contains the individual memory area A and the individual memory area A corresponds to the application A in the memory portion 130. The application A and the individual memory area A share the inherent authentication information A, so that the application A can access the individual memory area A using that authentication information.

The authentication information is written into each individual memory area when a command sent from authentication information management server 200 to the IC chip 110 is executed by a request from an application corresponding to the individual memory area. In the example of FIG. 2, a command is sent from the authentication information management server 200 to the IC chip 110 by a request from the application A and the command executing portion 112 executes that command to write authentication information A into the individual memory area A.

(Command Executing Portion 112)

The command executing portion 112 is a functional portion for executing the command for the IC chip sent from the authentication information management server 200. The command executing portion 112 receives a command sent from the authentication information management server 200 and executes the received command so as to read/write data into/from the internal memory 111. For example, if the content of the command is rewriting of data, this command contains information about data to be rewritten.

If the received command is encrypted, the command executing portion 112 decodes and executes the command. The command executing portion 112 has key information common to security module 240 of the authentication information management server 200 and decodes the command using that key information.

The internal configuration of the IC chip 110 has been described above.

(IC Chip Control Portion 120)

The IC chip control portion 120 is a functional portion having a function for controlling access to the IC chip 110. Each application manages data in the IC chip 110 on the information processing terminal 100 through the IC chip control portion 120. If an individual memory area contained in the internal memory 111 of the IC chip 110 is accessed from the application, the IC chip control portion 120 authenticates using authentication information stored for each application in the memory portion 130 and authentication information stored in the individual memory area. As the authentication method for use here, password authentication using a password composed of a predetermined quantity of characters and numerals may be used.

If the authentication succeeds, the application can access the individual memory area in the internal memory 111 through the IC chip control portion 120. On the other hand, if the authentication fails, the result of access to the internal memory 111 fails, so that the application cannot read/write data in the internal memory 111.

In the meantime, the IC chip control portion 120 according to the first embodiment may be configured in any one of hardware and software as long as it is loaded in the information processing terminal 100.

(Memory Portion 130)

The memory portion 130 is a memory medium for memorizing a program of various kinds of applications for achieving the function of the information processing terminal 100 or data for use by each application. The applications which are stored in the memory portion 130 include an application for managing/controlling various services loaded in the IC chip 110. For example, if the IC chip 110 is loaded with point service function, the application for recognizing the quantity of points stored in the IC chip on the information processing terminal 100 is contained in the memory portion 130.

The memory portion 130 largely contains an application memory area which stores applications and a data memory area which stores data for use by each application. For an application stored in the application memory area, a corresponding data memory area is secured. For example, the application memory area stores the application A and application B for managing/controlling services loaded in the IC chip 110, and data memory areas 130A and 130B corresponding to each application are secured in the memory area 130.

The authentication information for use in authentication upon accessing the internal memory 111 of the IC chip 110 from an application is stored in data memory area (not shown) corresponding to the application. That is, the authentication information A for use in authentication of the application A is stored in the data memory area 130A and the authentication information B for use in authentication of the application B is stored in the data memory area 130B. In the meantime, the data memory area which stores the authentication information may be configure to have tamper resistance in order to block the authentication information form being changed or stolen easily.

The memory portion 130 may be configured of a memory medium, for example, electrically erasable and programmable read only memory (EEPROM), flash memory or ferroelectric random access memory (FeRAM).

Although in this embodiment, the memory portion 130 has been described as a component which is incorporated in the information processing terminal 100, the present invention is not limited to this example, but it may be configured to be detachable from the information processing terminal 100. Alternatively, this embodiment may be carried out in case where it is connected with the information processing terminal 100 externally through a USB cable or the like.

(Application Executing Portion 140)

The application executing portion 140 is a functional portion for reading and executing programs of various applications stored in the memory portion 130. The application executing portion 140 accesses the IC chip 110 through the IC chip control portion 120 and reads/writes data from/into the IC chip 110 so as to achieve the function of each application.

The application executing portion 140 sends a command to the authentication information management server 200 through a network. Further, the application executing portion 140 sends the command sent from the authentication information management server 200 to the IC chip 110 through the IC chip control portion 120 and that command is executed by the IC chip 110. The commands sent here include commands for executing issue/erase of an area to the internal memory 111 in the IC chip 110 and data read/write processing and the like.

The application executing portion 140 sets up authentication information in the individual memory area of the internal memory 111 in the IC chip 110 or sends a request for reading the set authentication information to the authentication information management server 200 in a process of executing each application.

For example, the application executing portion 140 can send a request for setting the authentication information in the individual memory area corresponding to an application being executed (authentication information setting request) to the authentication information management server 200. In this embodiment, the set authentication information is generated by the application and sent to the authentication information management server 200 together with the authentication information setting request. After the processing for setting the authentication information by the authentication information management server 200 is completed, the application executing portion 140 can confirm that the authentication information is set in the individual memory area by receiving a notice about processing termination from the authentication information management server 200.

To access an individual memory area (individual memory area of other application) not corresponding to any application being executed, the application executing portion 140 can send a request for acquiring the authentication information of the individual memory area (authentication information acquiring request) to the authentication information management server 200. The application executing portion 140 may store authentication information notified of from the authentication information management server 200 into a data memory area of the application requesting for the authentication information in the memory area 130. Alternatively, if the authentication information does not need to be held permanently, the application executing portion 140 may acquire the authentication information from the authentication information management server 200 each time access is generated, without storing the authentication information in the data memory area.

The configuration of the information processing terminal 100 has been described above.
(Authentication Information Management Server 200)

Next, the configuration of the authentication information management server 200 will be described. As shown in FIG. 1, the authentication information management server 200 includes an authentication information setting portion 210, authentication information notifying portion 220, an application authentication portion 230 and a security module 240. Hereinafter, respective components of the authentication information management server 200 will be described.
(Authentication Information Setting Portion 210)

The authentication information setting portion 210 is a functional portion for setting the authentication information in the individual memory area within the internal memory 111 of the IC chip 110 based on a request from an application executed by the application executing portion 140 of the information processing terminal 100.

The authentication information setting portion 210 communicates with the application executing portion 140 of the information processing terminal 100 and generates a command (command to be executed by the IC chip 110) corresponding to an authentication information setting request from an application executed by the application executing portion 140.

According to this embodiment, the authentication information to be set in the individual memory area is generated by the application itself and sent from the application executing portion 140 such that it is included in the authentication information setting request. The authentication information setting portion 210 generates a command for writing sent authentication information to an individual memory area corresponding to the application.

Further, the authentication information setting portion 210 inputs a generated command into the security module 240. The security module 240 encrypts an inputted command using a random value (one-time password) generated by each communication and sends back the encrypted command to the authentication information setting portion 210. The authentication information setting portion 210 sends a command encrypted by the security module 240 to the command executing portion 112 of the information processing terminal 100.

If a notice about completion of setting is received from the command executing portion 112, the authentication information setting portion 210 sends a processing completion notice to the application executing portion 140 and terminates the setting processing for the authentication information.
(Authentication Information Notifying Portion 220)

The authentication information notifying portion 220 is a functional portion which in response to a request from an application to be executed by the application executing portion 140 of the information processing terminal 100, notifies of the authentication information of the individual memory area corresponding to other application than that application.

The authentication information notifying portion 220 communicates with the application executing portion 140 of the information processing terminal 100 and generates a command (command to be executed by the IC chip 110) corresponding to the authentication information acquiring request from an application executed by the application executing portion 140.

The authentication information acquiring request contains information indicating any individual memory area contained in the internal memory 111 of the IC chip 110. The authentication information notifying portion 220 generates a command for reading out the authentication information from the individual memory area. Further, the authentication information notifying portion 220 inputs a generated command into the security module 240, receives an encrypted command from the security module 240 and sends it to the command executing portion 112.

After acquiring the authentication information from the command executing portion 112, the authentication information notifying portion 220 notifies the application executing portion 140 of the authentication information and terminates the processing of notifying of the authentication information.
(Application Authentication Portion 230)

The application authentication portion 230 is a functional portion which when a request for executing a predetermined processing to the IC chip 110 is received from an application executed by the application executing portion 140 of the information processing terminal 100, executes authentication to that application.

When an authentication information setting request is received from the application executing portion 140 of the information processing terminal 100, the application authentication portion 230 authenticates whether or not the application which has made the request (application being executed by the application executing portion 140) is an application having privilege of setting up authentication information in a target individual memory area. Alternatively, when an authentication information acquiring request is received from the application executing portion 140, the application authentication portion 230 authenticates whether or not the application which has made the request is an application having privilege of acquiring the authentication information of a target individual memory area.

For authentication, an identifier or the like indicating the application of a requester contained in the authentication information setting request may be used. Alternatively, the application authentication portion 230 may preliminarily register a certificate (public key) to an application in the authentication information management server 200 using a mechanism of the certificate of PKCS#1 (public key cryptography standard #1) and authenticate using a ticket (data encrypted with secrete key) sent from the application when requested. The content of processing which each application has privilege of executing to each individual memory area is preliminarily registered in the application authentication portion 230 and the application authentication portion 230 authenticates the application of the requester by referring to the registered content.

(Security Module 240)

The security module 240 is a functional portion which has tamper resistance, performs security processing and manages the key for use in security processing (encryption/decoding). The security module 240 encrypts a command supplied from each portion of the authentication information management server 200 and outputs an encrypted command to the authentication information management server 200. For encryption, for example, a random value (one-time password) which is generated and exchanged by the security module 240 and the IC chip 100 at each communication may be used. The security module 240 encrypts the random value using key information common to the IC chip 110 and sends to the IC chip 110, so that the security module 240 shares the random value with the IC chip 110 so as to communicate with the IC chip 110. After that, all executed commands and written data are encrypted with a generated random value at each communication and consequently, encrypted communication is achieved between the authentication information management server 200 and the IC chip 110.

Figure 3:
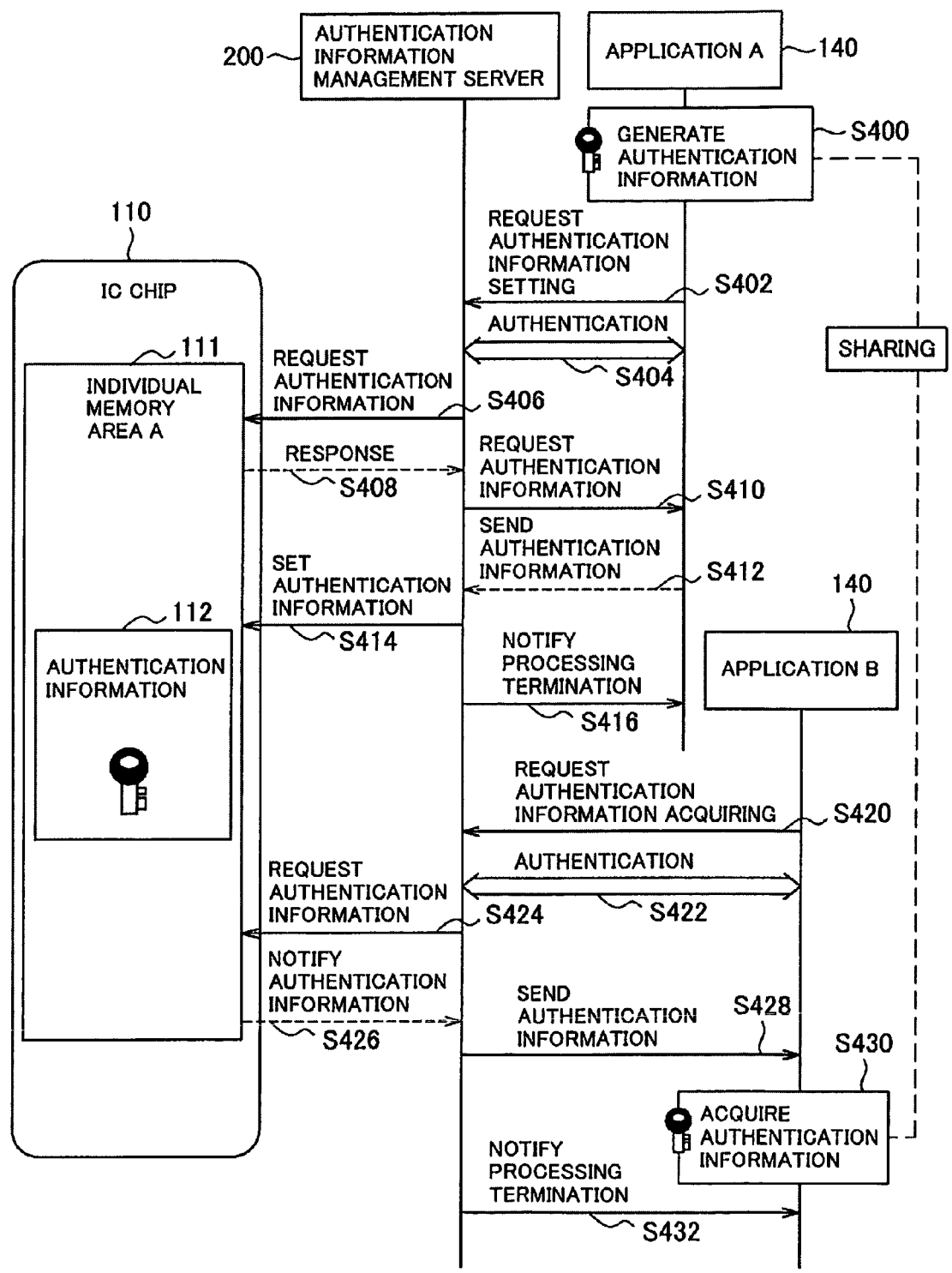
FIG. 3 is a sequence diagram showing a flow of authentication information management processing executed in authentication information management system according to the first embodiment.

The configuration of the authentication information management system 10 according to the first embodiment has been described above. Next, an example of management processing for the authentication information executed between the information processing terminal 100 and the authentication information management server 200 will be described with reference to FIG. 3. FIG. 3 is a sequence diagram showing a flow of the authentication information management processing to be executed in the authentication information management system 10.

First, a flow of setting processing for the authentication information indicated in steps S400-S416 of FIG. 3 will be described.

First, in step S400, the application A executed by the application executing portion 140 generates the authentication information of the individual memory area A. Next, in step S402, the application A requests the authentication information management server 200 to set up the authentication information.

The authentication information management server 200 which has received the authentication information setting request verifies whether or not the application A has the setting privilege for the authentication information to the individual memory area A in step S404. The verification may be carried out by referring to the content of processing which each application has privilege of executing, held by the application authentication portion 230 of the authentication information management server 200. If the application A has no setting privilege for the authentication information, the application A is notified of that matter and the processing is terminated.

If it is testified that it has the setting privilege, the authentication information setting portion 210 of the authentication information management server 200 executes the setting processing of the authentication information. First, in step S406, the authentication information setting portion 210 reads out the authentication information of the individual memory area A of the IC chip 110. If a response from the IC chip 110 is obtained in step S408, the authentication information setting portion 210 confirms whether or not the authentication information is already set based on the response content. If the authentication information has been already set up, the processing may be terminated or it may be rewritten with newly generated authentication information.

Next, in step S410, the authentication information management server 200 requests the application A for an authentication information to be set up. In step S412, the application A sends the authentication information generated in step S400 to the authentication information management server 200 in response to the request form the authentication information management server 200.

In step S414, the authentication information setting portion 210 of the authentication information management server 200 generates a command for setting the authentication information received in step S412 in the individual memory area A and sends it to the command executing portion 112 of the IC chip 110. Alternatively, before sending a command, the security module 240 may encrypt the command and the authentication information setting portion 210 may send the encrypted command.

The command executing portion 112 of the IC chip 110 writes the authentication information of the individual memory area A by executing a command sent from the authentication information management server 200. If the command is encrypted, the command executing portion 112 may decode the command and then execute the command.

Next, in step S416, the IC chip 110 notifies the application A that the setting processing for the authentication information has been terminated. Consequently, the setting processing for the authentication information to the individual memory area A is terminated. The application A can set the authentication information in the individual memory area A which it manages and after that, can access the individual memory area A using the set authentication information.

Next, a flow of notifying processing for the authentication information indicated in steps S420-S432 of FIG. 3 will be described. Before the application B accesses the individual memory area A which the application A manages, processing for acquiring the authentication information of the individual memory area A is carried out.

First, in step S420, the application B sends a acquiring request for the authentication information of the individual memory area A to the authentication information management server 200.

After receiving the authentication information acquiring request, the authentication information management server 200 verifies whether or not the application B has a privilege for acquiring the authentication information to the individual memory area A. This verification may be executed by referring to the content of a processing which each application held by the application authentication portion 230 of the authentication information management server 200 has the privilege of executing. If the application B has no privilege for acquiring the authentication information, the application B is notified of that matter and the processing is terminated.

If it is testified that the privilege for setting is possessed, the authentication information notifying portion 220 of the authentication information management server 200 requests the IC chip 110 for authentication information of the individual memory area A in step S424. In step S426, the IC chip 110 notifies the authentication information notifying portion 220 of the authentication information of the individual memory area A. Next, in step S428, the authentication information notifying portion 220 sends the authentication information which is notified the application B of.

In step S430, the application B stores the notified authentication information in the data storage area of the memory portion 130. Alternatively, the application B may acquire the authentication information from the authentication information management server 200 each time the individual memory area A is accessed, without storing the authentication information in the memory portion 130.

Finally, in step S432, the authentication information notifying portion 220 of the authentication information management server 200 notifies the application B of a termination of the processing. Consequently, the application B can acquire the authentication information of the individual memory area A of the IC chip controlled by the other application A and access the individual memory area A using the acquired authentication information. When receiving a request from the application B, the authentication information management server 200 can exclude an unnecessary access from an application having no privilege of accessing the individual memory area A by performing the authentication processing on the application B.

Second Embodiment

Next, the authentication information management system of the second embodiment of the present invention will be described. The authentication information management system according to this embodiment has substantially the same configuration as the authentication information management system of the first embodiment except partly. Hereinafter, only different points between this embodiment and the first embodiment will be described for avoiding the duplicated description.

Although in the first embodiment, the authentication information set to the individual memory area of the internal memory 111 of the IC chip 110 is generated by each application of the information processing terminal 100 and sent to the authentication information management server 200, according to this embodiment, the authentication information management server 200 generates the authentication information.

The authentication information setting portion 210 of the authentication information management server 200 according to this embodiment communicates with the application executing portion 140 of the information processing terminal 100 like the first embodiment and generates a command (command to be executed by the IC chip 110) to answer an authentication information setting request from the application executed by the application executing portion 140.

The authentication information setting portion 210 generates the authentication information of the individual memory area before generating a command. After that, the authentication information setting portion 210 generates a command for writing the generated authentication information into the individual memory area, encrypts it by means of the security module 240 and sends the encrypted command to the command executing portion 112 of the information processing terminal 100. The authentication information setting portion 210 notifies the application executing portion 140 of the generated authentication information through encryption and the application executing portion 140 stores the notified authentication information in the data memory area corresponding to that application. As a result, the authentication information is shared between the application and the individual memory area, so that the application can access the individual memory area.

Figure 4:
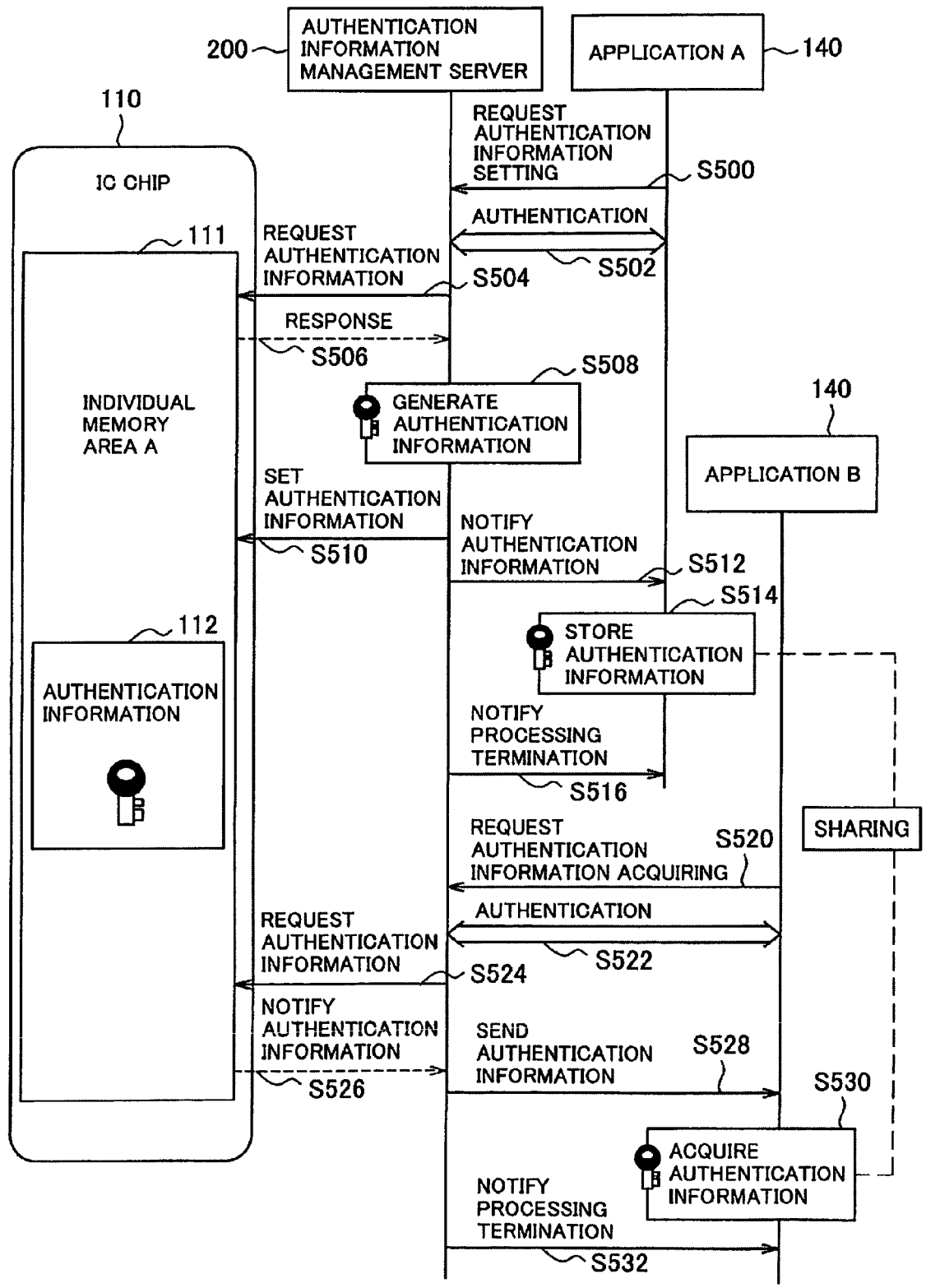
FIG. 4 is a sequence diagram showing the flow of authentication information management processing executed in the authentication information management system according to a second embodiment.
Figure 5:
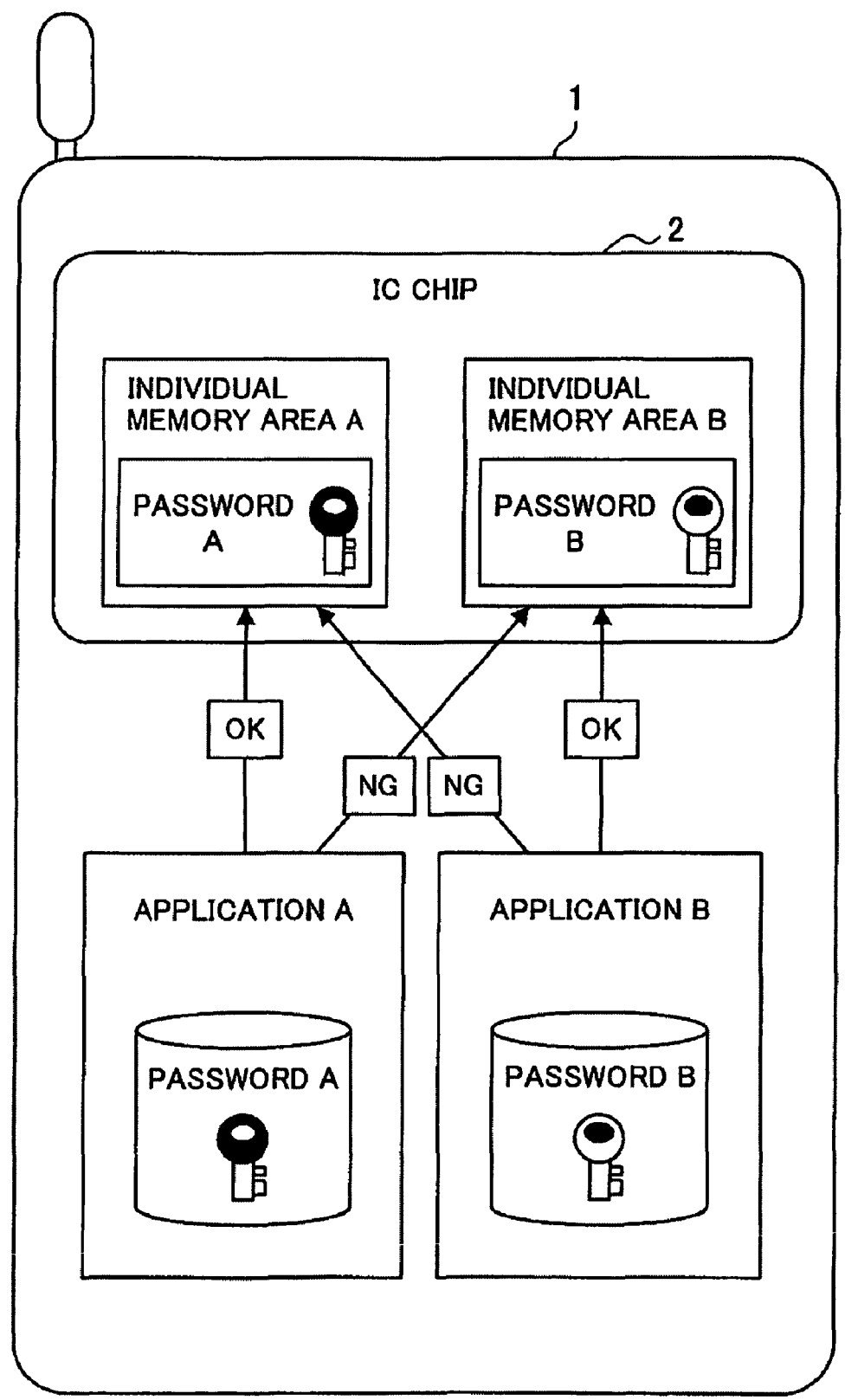
FIG. 5 is an explanatory diagram for explaining the management method for authentication information implemented in a conventional IC chip.

An example of management processing for the authentication information executed in the authentication information management system according to the second embodiment will be described with reference to FIG. 4. FIG. 4 is a sequence diagram showing a flow of the authentication information management processing executed in the authentication information management system according to the second embodiment.

First, in step S500, the application A being executed by the application executing portion 140 requests the authentication information management server 200 to set the authentication information.

In step S502, the authentication information management server 200 which has received the authentication information setting request verifies whether or not the application A has the privilege for setting the authentication information to the individual memory area A. Because the same processing as in step S404 of the first embodiment is carried out here, detailed description thereof will not be described.

If it is testified that the application A has the setting privilege, the authentication information setting portion 210 of the authentication information management server 200 executes the processing for setting the authentication information. First, in step S504, the authentication information setting portion 210 reads out the authentication information of the individual memory area A of the IC chip 110. Next, if a response is obtained from the IC chip 110, the authentication information setting portion 210 confirms whether or not the authentication information is set already based on the content of the response in step S506. If the authentication information is set up, the processing may be terminated or may be rewritten with newly generated authentication information.

Next, in step S508, the authentication information setting portion 210 generates the authentication information. In step S510, the authentication information setting portion 210 generates a command for setting generated authentication information in the individual memory area A and sends it to the command executing portion 112 of the IC chip 110. Before sending, the security module 240 may encrypt the command and the authentication information setting portion 210 may send the encrypted command.

The command executing portion 112 of the IC chip 110 writes the authentication information in the individual memory area A by executing a command sent from the authentication information management server 200. If the command is encrypted, the command executing portion 112 may execute the command after decoding it.

Next, in step S512, the authentication information setting portion 210 notifies the application A of the authentication information generated in step S508. In step S514, the application A stores the notified authentication information. Consequently, the authentication information is shared by the application A and the individual memory area A.

Finally, in step S516, the authentication information setting portion 210 notifies the application A that the setting processing for the authentication information has been terminated. Consequently, the setting processing for the authentication information to the individual memory area A is terminated.

Because the authentication information notifying processing of steps S520-S532 is substantially the same as the processing of steps S420-S432 in the first embodiment, related duplicated description will not be described.

Consequently, this embodiment allows the authentication information generated each time the application sends an authentication information setting request to the authentication information management server 200 to be shared with other applications.

Although the preferred embodiments of the present invention have been described with reference to the accompanying drawings, needless to say, the present invention is not limited to such embodiments. It is evident that those skilled in art can reach various kinds of modifications and corrections within a range described in the scope of claim of the invention and it is naturally understood that those belong to the technical range of the present invention.

Although the above embodiment has been described by taking an example that the IC chip 110 is configured in the form of a non-contact type IC chip so as to communicate with the reader/writer 400 or the like wirelessly, the present invention is not limited to this example. For example, the IC chip 110 may be configured as a contact type IC chip.

Further, although the above embodiment has been described by taking an example that the information processing terminal 100 is a portable phone, the present invention is not limited to such an example. For example, the information processing terminal 100 may be a personal digital assistant (PDA) or notebook personal computer.

Although the above embodiments have been described by taking an example that the information processing terminal 100 and the authentication information management server 200 communicate with each other through a communication network provided by a portable phone communication carrier, the present invention is not limited to such an example. For example, the information processing terminal 100 may be connected to a network (Internet, LAN or the like) which the authentication information management server 200 is connected to so as to communicate through the network. Alternatively, it is permissible to connect the information processing terminal 100 to a computer connected to the network using a communication cable or the like so as to communicate with the computer through the network. Further, the communication may be carried out between the IC chip 110 and the reader/writer through wireless carrier by holding the information processing terminal 100 over the reader/writer connected to the network so that the information processing terminal 100 and the authentication information management server 200 communicate with each other through the reader/writer and the network.

What is claimed is:

1. An authentication information management system comprising: an information processing terminal mounted with an IC chip capable of non-contact communication with a reader/writer; and an authentication information management server capable of communication with the information processing terminal through a network, wherein
the information processing terminal includes:
a plurality of memory areas provided in the IC chip for each of functions of the IC chip; and
a plurality of applications corresponding to each of the memory areas and for achieving each of the functions of the IC chip, and the authentication information management server includes:
an authentication information setting portion for setting authentication information for use in accessing a first memory area corresponding to a first application in the first memory area in response to an authentication information setting request sent from the first application of the information processing terminal; and
an authentication information notifying portion which in response to an authentication information acquiring request sent from a second application of the information processing terminal, reads out the authentication information of the first memory area and notifies the second application of the read authentication information.

2. An authentication information management server capable of communication with an information processing terminal mounted with an IC chip capable of non-contact communication with a reader/writer through a network and including a plurality of memory areas provided in the IC chip for each of functions of the IC chip and a plurality of applications corresponding to each of the memory areas and for achieving each of the functions of the IC chip, the authentication information management server comprising:
an authentication information setting portion for setting authentication information for use in accessing a first memory area corresponding to a first application in the first memory area in response to an authentication information setting request sent from the first application of the information processing terminal; and
an authentication information notifying portion which in response to an authentication information acquiring request sent from a second application of the information processing terminal, reads out the authentication information of the first memory area and notifies the second application of the read authentication information.

3. The authentication information management server according to claim 2, wherein the authentication information setting portion receives the authentication information generated by the first application from the first application and sets the received authentication information in the first memory area.

4. The authentication information management server according to claim 2, wherein the authentication information setting portion generates the authentication information in response to the authentication information setting request from the first application, sets the generated authentication information in the first memory area and sends the authentication information to the first application.

5. The authentication information management server according to claim 2 further comprising an application authentication portion which when the authentication information setting request is received from the first application, authenticates whether or not the first application has a authority for setting the authentication information in the first memory area.

6. The authentication information management server according to claim 2 further comprising an application authentication portion which when the authentication information acquiring request to the first memory area is received from the second application, authenticates whether or not the second application has a privilege for acquiring the authentication information of the first memory area.

7. An authentication information management method in an authentication information management server capable of communication with an information processing terminal mounted with an IC chip capable of non-contact communication with a reader/writer through a network and including a plurality of memory areas provided in the IC chip for each of functions of the IC chip and a plurality of applications corresponding to each of the memory areas and for achieving each of the functions of the IC chip, the authentication information management method comprising the steps of:

setting authentication information for use in accessing a first memory area corresponding to a first application in the first memory area in response to an authentication information setting request sent from the first application of the information processing terminal; and reading out the authentication information of the first memory area and notifying a second application of the read authentication information in response to an authentication information acquiring request sent from the second application of the information processing terminal.

8. A program for making a computer function as an authentication information management server capable of communication with an information processing terminal loaded with an IC chip capable of non-contact communication with a reader/writer through a network and including a plurality of memory areas provided in the IC chip for each of functions of the IC chip and a plurality of applications corresponding to each of the memory areas and for achieving each of the functions of the IC chip, the authentication information management server comprising:

an authentication information setting portion for setting authentication information for use in accessing a first memory area corresponding to a first application in the first memory area in response to an authentication information setting request sent from the first application of the information processing terminal; and an authentication information notifying portion which in response to an authentication information acquiring request sent from a second application of the information processing terminal, reads out the authentication information of the first memory area and notifies the second application of the read authentication information.

* * * * *

UNITED STATES PATENT AND TRADEMARK OFFICE
CERTIFICATE OF CORRECTION

| | | |
|---|---|---|
| PATENT NO. | : 7,946,473 B2 | Page 1 of 1 |
| APPLICATION NO. | : 12/121513 | |
| DATED | : May 24, 2011 | |
| INVENTOR(S) | : Mitsuhiro Kimura et al. | |

It is certified that error appears in the above-identified patent and that said Letters Patent is hereby corrected as shown below:

On the Title Page, Item (73), in the Assignee, line 9, "Sony Corporation" should read --FeliCa Networks, Inc.--.

Signed and Sealed this
Eleventh Day of December, 2012

David J. Kappos
*Director of the United States Patent and Trademark Office*